United States Patent
Wen et al.

(10) Patent No.: US 8,321,262 B1
(45) Date of Patent: Nov. 27, 2012

(54) METHOD AND SYSTEM FOR GENERATING PRICING RECOMMENDATIONS

(75) Inventors: Aihong Wen, Houston, TX (US); Darius Walczak, The Woodlands, TX (US)

(73) Assignee: PROS, Inc., Houston, TX (US)

( * ) Notice: Subject to any disclaimer, the term of this patent is extended or adjusted under 35 U.S.C. 154(b) by 1211 days.

(21) Appl. No.: 12/132,772

(22) Filed: Jun. 4, 2008

(51) Int. Cl.
*G06Q 99/00* (2006.01)
(52) U.S. Cl. .......... 705/7.35; 705/7.12; 705/36; 705/38; 705/400
(58) Field of Classification Search .............. 705/35–37, 705/400, 7.12, 7.35, 38
See application file for complete search history.

(56) References Cited

U.S. PATENT DOCUMENTS

| | | | |
|---|---|---|---|
| 6,085,216 A * | 7/2000 | Huberman et al. | 718/104 |
| 7,133,848 B2 * | 11/2006 | Phillips et al. | 705/400 |
| 7,343,337 B1 * | 3/2008 | Cieliebak et al. | 705/36 R |
| 2001/0032332 A1 * | 10/2001 | Ward et al. | 717/9 |
| 2005/0021435 A1 * | 1/2005 | Hakanoglu et al. | 705/36 |
| 2005/0187848 A1 * | 8/2005 | Bonissone et al. | 705/36 |
| 2007/0043655 A1 * | 2/2007 | Phillips et al. | 705/38 |
| 2007/0124227 A1 * | 5/2007 | Dembo et al. | 705/36 R |

OTHER PUBLICATIONS

Dr. Robert L. Phillips, "Five Keys to Finding the 'right' price", Nov.-Dec. 2007, BAI Banking Strategies, pp. 1-6.*
Jose Moreno Codina and Francisco Gomez-Alvado, "Property/Casualty Insurance Price Optimization for Profit and Growth", Apr. 2008; Emphasis, pp. 18-21.*
Garrett J. van Ryzin and Kalyan T. Talluri; "An Introduction to Revenue Management", 2005, Tutorials in Operations Research, pp. 142-194.*
Clemons, Eric; Hann, Il-Horn; and Hitt, Lorin M., "Price Dispersion and Differentiation in Online Travel: An Empirical Investigation", Apr. 2002, Management Science, vol. 48, No. 4, pp. 534-549.*
Bernstein et al., "Diversification, Rebalancing, and the Geometric Mean Frontier", Efficient Solutions, Inc., 1-27, Nov. 24, 1997, downloaded from effisols.com/basics/rebal.htm.
Visual Numerics, Inc., "Portfolio Optimization via Efficient Frontier with the IMSL Numerical Libraries", A White Paper, 1-10, Mar. 2008.

* cited by examiner

*Primary Examiner* — John Hayes
*Assistant Examiner* — Freda A Nelson
(74) *Attorney, Agent, or Firm* — Crowell & Moring LLP

(57) ABSTRACT

Systems and methods for optimizing marketing strategies. Various embodiments implement methods which can include generating a plurality of candidate solutions which satisfy pricing rationality constraints. The candidate solutions can be generated when processing resources are available for performing a Monte Carlo algorithm. The candidate solutions can be stored and a master and trade off metric can be selected. Values for these selected metrics can be evaluated (at the candidate solutions) and then input into the approximate efficient frontier algorithm. The algorithm can output an approximate efficient frontier. Users can select any of the efficient solutions on the frontier to obtain associated pricing recommendations by mousing over the efficient frontier. Various metrics associated with the efficient frontier may be updated at about the same time as the master and trade off metrics are selected.

21 Claims, 4 Drawing Sheets

METHOD AND SYSTEM FOR GENERATING PRICING RECOMMENDATIONS

TECHNICAL FIELD

Embodiments disclosed herein relate generally to systems and methods for managing revenue and optimizing prices. More particularly, certain embodiments relate to optimizing prices when insights into trade-offs between business metrics may be desired.

BACKGROUND

Optimization may be pertinent to many business scenarios or other applications. For instance, business owners often desire to optimize gross revenue, net revenue, profit, sales volume, etc. These goals change from time to time, as circumstances suggest, and may apply to the entire business, a subdivision of the overall organization such as a subsidiary, a division, a department, a product line, individual products, etc. These same goals may be directed toward particular customer segments based on demographic data, or other geographic, income, age, or other distinctions in the customer population.

In certain circumstances a business may, for a variety of reasons, seek to substantially optimize one metric of their performance while also satisfying a goal as measured by another metric. An example of these multi-metric optimization goals is maximizing one metric while satisfying a minimum level of performance as measured by a second metric. While the ability to optimize performance as measured by one metric can be difficult, optimizing performance as measured by two metrics is more difficult still. Indeed, satisfying one goal might worsen performance related to the first goal.

Personnel associated with a business may wish to explore a number of alternatives to achieving their goals. Often, they use computerized models to evaluate the effects of various pricing strategies (such as changing a pricing list). These models may utilize historic market data, data concerning market response to various stimuli, potentially numerous metrics, linear and non-linear constraints, various analytic tools, etc. The output of these models often includes graphs which portray relationships between master metrics and trade off metrics in the form of various efficient frontiers (where master metrics can be those metrics which users may wish to optimize while satisfying some constraint on another metric, which can be termed the trade off metric). Business personnel use efficient frontiers to evaluate various options available to them to optimize aspects of the business. Propagating even a relatively small change through such complex models can consume significant processing resources associated with the models. Indeed, modifications to these models may have to occur when processing resources are free (such as at night), in part, to avoid monopolizing these resources. Thus, business personnel may be limited in their ability to use efficient frontiers in their efforts to optimize their businesses due to limitations in computational infrastructure.

SUMMARY OF THE DESCRIPTION

Embodiments of the present disclosure provide systems and methods that eliminate, or at least substantially reduce, the shortcomings of prior art systems and methods for optimizing prices.

Various embodiments implement two part methods for optimizing prices when studying trade-offs between metrics may be desired. One of the two parts can be performed off line when computational resources are available while the other part can be performed on line, in real time (or rapidly enough to keep pace with user requests for analysis of new or modified optimization scenarios) if desired. Off line, a large number of candidate solutions can be generated. A candidate solution is a pricing recommendation (a list of prices for products) that satisfies price rationality constraints associated with a business and the appropriate bounds on product prices. Here price rationality constraints can refer to a desired relationship between prices for different products. An example of a rationality constraint could be that a price for large size t-shirt must be equal to or greater than that of a small size t-shirt of the same type as the large size t-shirt. Bounds here can refer to a desired maximum (minimum) value that a price can be. An example of a bound could be that the price for a t-shirt must be at least 5 dollars. In some embodiments, a Monte Carlo approach can be used to generate the candidate solutions. A user may select a pair of metrics from a collection of metrics associated with the business and, using a real time algorithm, generate an approximate efficient frontier (for the selected pair of metrics) from the candidate solutions. The user may then select a point on the approximate efficient frontier (by mousing over the point in some embodiments) and obtain a pricing recommendation associated with the selected candidate solution in real time.

Embodiments implement methods which can include generating a plurality of candidate solutions which satisfy rationality constraints associated with an efficient frontier wherein some of the candidate solutions will be selected to approximate some points on the efficient frontier. The candidate solutions can be generated using a Monte Carlo algorithm with a single objective (formed from one or more metrics) and can be stored in a repository for subsequent use. To evaluate various optimization scenarios, users can select pairs of master and trade off metrics, update business parameters in the model, etc. and then generate an approximate efficient frontier (based on the candidate solutions) which incorporates the users' selections and updates. Using the approximate efficient frontier, users can select candidate solutions, (by mousing over it in some embodiments) and obtain pricing recommendations associated with the selected candidate solutions.

Some embodiments provide a system including a user interface, a processor, and a machine readable medium which are in communication with each other. The machine readable medium can carry instructions for the processor to generate candidate solutions. The processor can store the candidate solutions in a repository. When desired, users can select pairs of master and trade off metrics. Using the selected metrics, the processor can generate approximate efficient frontiers with various candidate solutions (some of which will be selected to approximate some points on optimized efficient frontiers for the same metrics). Some embodiments provide computer readable medium with such instructions stored thereon.

Various embodiments can be applied to any industry (such as the financial services industry) wherein marketing strategies can be employed to optimize various metrics. Users may generate multiple efficient frontiers in real-time and use the efficient frontiers to obtain pricing recommendations. Embodiments provide visibility into tradeoffs between many different metrics. Computationally intensive activities can be performed off line, thereby reducing computational resources used in on-demand generation of efficient frontiers. Embodiments rapidly propagate ad hoc parameter changes and updates through models underlying the efficient frontiers. Visibility into the impact of ad hoc changes can therefore be provided by some embodiments.

Various embodiments provide advantages over previously available optimization approaches. According to some embodiments, computationally intensive operations may be performed off line, when computing resources are available such as during over night or batch sessions. In some scenarios, where a price rationality constraint changes, a new set of candidate solutions can be generated to incorporate the changes. In various embodiments, users can achieve a desired level of agreement between approximate efficient frontiers and optimized efficient frontiers by varying the number of candidate solutions generated. Candidate solutions generated according to various embodiments can be retained for use in subsequent analyses with the same pricing constraints. Operations in support of user activities can be sufficiently fast to keep pace with user requests for newly generated approximate efficient frontiers analyses.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions, or rearrangements may be made within the scope of the disclosure, and the disclosure includes all such substitutions, modifications, additions, or rearrangements.

BRIEF DESCRIPTION OF THE FIGURES

A more complete understanding of the disclosure and the advantages thereof may be acquired by referring to the following description, taken in conjunction with the accompanying drawings in which like reference numbers generally indicate like features and wherein.

DETAILED DESCRIPTION

Figure 1:
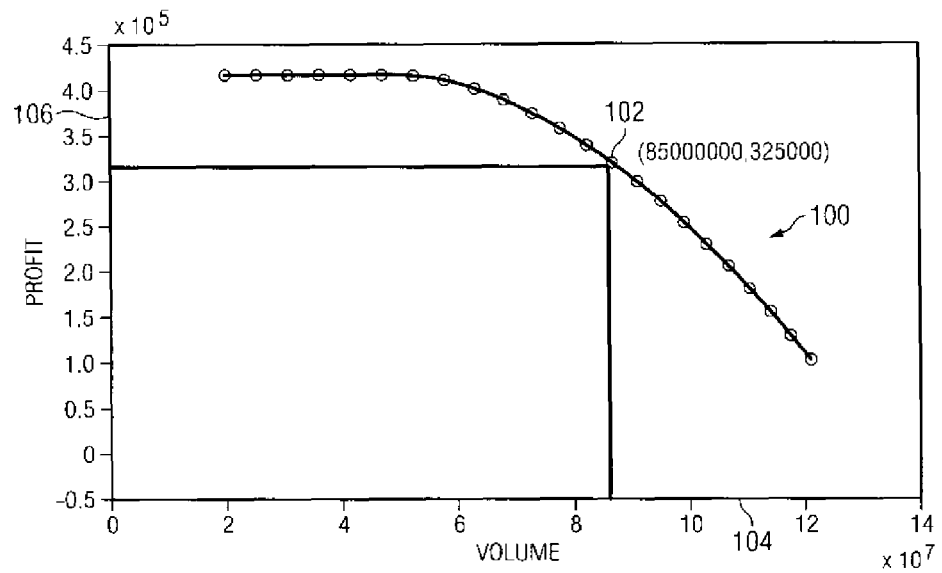
FIG. 1 illustrates a graph of one embodiment of an efficient frontier.

Various embodiments of the disclosure are illustrated in the FIGURES, like numerals being generally used to refer to like and corresponding parts of the various drawings. Embodiments of the disclosure provide systems and methods for optimizing prices when trade-offs between metrics may be desired.

Before discussing specific embodiments, an embodiment of a hardware architecture for implementing certain embodiments is described herein. One embodiment can include a computer communicatively coupled to a network (the Internet in some embodiments). As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

The functionalities and processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Optimizing performance of an enterprise such as a business can be a difficult task. Typically, businesses offer many related products and services. Attempts to market one product may affect attempts to market another product. Market response to these offerings may be complex too. Modeling market responses may involve a number of interrelated variables, parameters, constraints, and metrics with which to measure market response. Models of market response can include equations, algorithms, etc. which characterize historic market responses to various marketing stimuli. Users of market models sometimes attempt to optimize some aspect of the business by forecasting responses to various market optimization scenarios. Due to the complexity of market models, though, computing systems which run these models may require lengthy processing times to produce results. More particularly, previously available approaches to optimizing market response have required such lengthy processing times that updating or modifying market models could require hours of processing time. When processing does complete, the output of market models can include market forecasts as well as pricing recommendations intended to meet some user specified goal. Various embodiments provide improved pricing methods and systems.

According to some embodiments, efficient frontiers 100 are two-dimensional plots of relationships between two metrics which can be determined by various optimization models. The metric plotted along the horizontal axis can be termed trade-off metric 104 and the metric plotted along the vertical axis can be termed master metric 106. FIG. 1 shows that sales volume can be trade-off metric 104 and profit can be master metric 106. Efficient frontiers 100 can be useful in understanding market response as the values for various parameters and business goals change. Using efficient frontiers 100, users can determine the best possible value of master metric 106 for a particular desired value of trade off metric 104.

FIG. 1 depicts one embodiment of efficient frontier 100. Pricing recommendations output by market models can include lists of various products with their corresponding prices. Table 1 below illustrates a possible pricing recommendation associated with efficient frontier 100 of FIG. 1 which can be associated with a financial services business.

TABLE 1

| Product No. | Recommended Interest Rate |
| --- | --- |
| 1 | 5.77% |
| 2 | 6.03% |
| 3 | 6.35% |
| 4 | 5.90% |
| 5 | 6.03% |
| 6 | 6.35% |
| 7 | 7.10% |
| 8 | 7.18% |
| 9 | 7.83% |
| 10 | 5.83% |
| 11 | 6.08% |
| 12 | 6.39% |
| 13 | 5.96% |
| 14 | 6.08% |
| 15 | 6.41% |
| 16 | 7.11% |
| 17 | 7.24% |
| 18 | 7.89% |
| 19 | 5.83% |
| 20 | 6.24% |
| 21 | 6.66% |
| 22 | 5.96% |
| 23 | 6.24% |
| 24 | 6.68% |

Products listed in Table 1 can be financial service products offered at the interest rates as shown. According to the particular market model which generated the pricing recommendation of Table 1, this pricing recommendation will likely result in certain values of revenue and sales volume. These values can correspond to point 102 on efficient frontier 100 of FIG. 1 which shows that $325,000 in profit and $8,500,000 in loan volume can be expected from using the pricing recommendation of Table 1. Also note that, in the current example, the $325,000 is the greatest profit one can expect given that at least $8,500,000 in loan volume is desired. This can be because this particular pricing recommendation is the result of an optimization where profit is the objective to be maximized subject to the said constraint on volume.

Efficient frontiers 100 and associated pricing recommendations can be generated by performing optimization procedures. Optimization procedures can factor in objectives and constraints as determined in separate business analyses. Business analyses often make use of forecasts based on historical market data to find the parameters and other variables related to the objectives and constraints. In practice, producing pricing recommendations can involve a large number of costly optimization runs when: 1) many product prices are involved, 2) it is desired to comply with relationships between product prices 3) a number of metrics exist to assess the pricing recommendations, 4) it is desired that particular metrics satisfy certain constraints or 5) combinations of these and other factors.

Because of the number of, and relationships between, various metrics, it is not always possible to obtain a solution that is best as measured according to all metrics of interest. In some scenarios, metrics such as profit and volume can diverge, thereby making optimizing both metrics simultaneously difficult. Instead of optimizing one metric at the expense of the other, or attempting the difficult task of optimizing more than one metric, a balanced solution can be sought which yields the best value for one metric while satisfying a constraint associated with the other metric. In one scenario, for example, a balanced solution can maximize profit while satisfying a minimum sales volume constraint.

Figure 2:
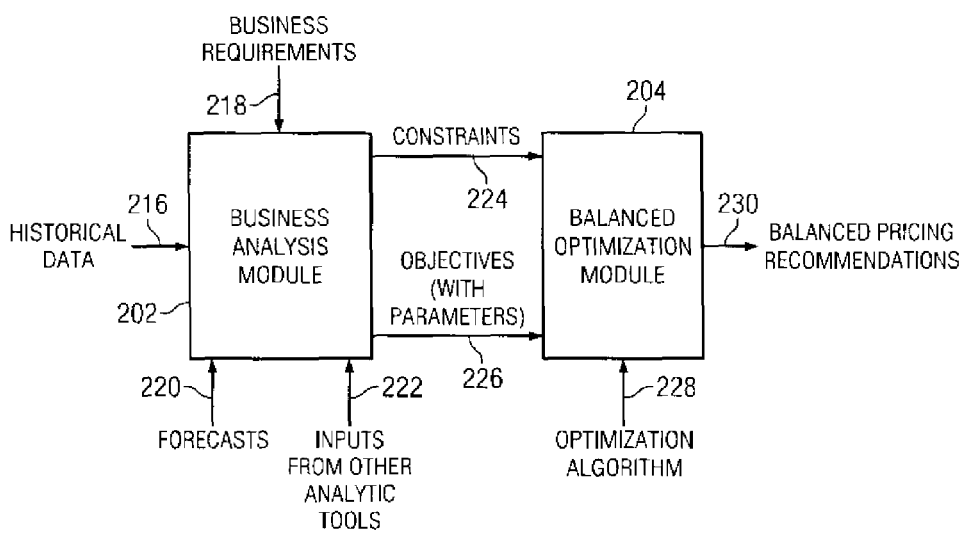
FIG. 2 illustrates a block diagram of one embodiment of a system.

Now with reference to FIG. 2, one embodiment of system 200 for developing balanced pricing recommendations is illustrated. System 200 can include analysis module 202 and optimization module 204. Inputs to analysis module 202 can include historical market data 216, business requirements 218, market forecasts 220, and inputs 222 produced by analytic tools (other than system 200). Analysis module 202 can analyze inputs 216, 218, 220, and 222 to produce constraints 224 and objectives 226 (along with associated model parameters). Optimization module 204 can receive constraints 224, objectives 226, and using a particular optimization algorithm 228. From inputs 224, 226, and 228, optimization module 204 can produce a large number of candidate solutions and then obtain, in real-time, a balanced pricing recommendation 230 with some interactive user interface.

One of the constraints 224 can indicate that it is desired that a particular metric meet some specified level. This constraint can be a constraint on the trade-off metric. To find the best response in terms of master metric 106 subject to the constraint on the trade-off metric (one of constraints 224), optimization module 204 can run a number of optimizations, one for each incremental value of this constraint. Each such solution can be termed an efficient solution since, being optimized; no better solution is likely to be found given the associated value of the constraint on the trade off metric. Optimization module 204 can output the resulting set of optimized solutions in the form of efficient frontiers 100 to provide visibility into these tradeoffs for users. Numerous optimizations can therefore be needed to generate even two-metric efficient frontiers 100.

While two metric optimization scenarios can be computationally intensive, including more than two metrics is even more challenging. Many businesses desire balanced pricing recommendations with respect to several metrics. In some scenarios, five metrics or more may be pertinent to balancing a pricing recommendation. With five metrics, twenty different pairs of metrics can be used to define various efficient frontiers 100 pertinent to the effort. To generate a pricing recommendation which can consider all tradeoffs between metrics, it may be desirable to generate all twenty metric pairs, each requiring numerous optimizations. Many scenarios therefore require large quantities of processing time and related resources.

Another aspect of efficient frontiers 100 involves the likelihood that parameters and business objectives pertinent to one or more efficient frontiers 100 may change unpredictably, or as desired, as users study various optimization scenarios. It is often desired that the impact of such changes be seen in real time, which can mean that the results are returned rapidly enough that the user's train of thought is unlikely to be interrupted because of a lengthy wait for those results. Market models which are so involved that they practicably necessitate off line, over night, batch, etc. processing of changes have difficulties in meeting these user desires when a parameter or business objective changes, though, pertinent efficient frontiers 100 (and associated optimizations) must be re-run in previously available systems, thereby delaying continued investigation and interrupting evolving user insights into the optimization scenario(s) under study.

Yet another aspect of efficient frontiers 100 concerns the difficulty of performing certain types of computations. Metrics can be represented by complex formulae, often nonlinear, and there can be constraints imposed on those metrics. Since nonlinear computations require more processing resources (such as iterations to optimize selected metrics) than linear computations, some efficient frontiers 100 may consume relatively large quantities of processing resources even when the number of metrics involved is low. When, as is sometimes the case, many metrics and many nonlinear constraints are involved, considerable processing time may be required to analyze the effects of any change to the market model, to generate a newly requested efficient frontier 100, etc.

One type of linear constraint that can be involved in generating efficient frontiers 100 can be expressed in the form:

priceOfProduct1<priceOfProduct2+constant.

Such constraints can be termed price rationality constraints to reflect such considerations as desiring that a premium product be priced above a basic product. In some scenarios, price rationality constraints can change infrequently although it is possible that price rationality constraints can change rapidly. For an established business, price rationality constraints might change infrequently whereas users developing a new business plan might vary such constraints many times. In some embodiments, it can be assumed that price rationality constraints remain the same for some or all optimization computations.

One type of nonlinear constraint pertinent to some efficient frontiers 100 can be minimum (or maximum) value constraints placed on certain metrics.

An example efficient frontier such as efficient frontier 100 of FIG. 1 can be represented mathematically as:

| MAX$_r$ | MasterMetric(r) |
|---|---|
| s.t. | $Ar \leq b$ |
| | $r \leq U$ |
| | $r \geq L$ |
| | TradeOffMetric (r) $\geq V_0$ | where r is the decision variable, MasterMetric is master metric 106, "$Ar \leq b$" is a collection of price rationality constraints, U is an upper bound associated with the decision variable r (a vector in general, as in the current example), L is a lower bound associated with the decision variable r, and "TradeOffMetric (r)$\geq V_0$" is a constraint associated with trade off metric 104. In some scenarios, master metric 106 is profit, trade off metric 104 is sales volume, and a pricing recommendation for a set of products can be represented by $r=[r_1, r_2, \ldots r_n]$ where n is the number of products included in the optimization. For efficient frontier 100 of FIG. 1, forty optimizations of the foregoing mathematical definitions were performed to generate efficient frontier 100, each for a different value of the constraint on the trade off metric 104 (such as volume). As mentioned above, the price rationality constraints "$Ar \leq b$" and bounds $r \leq U$ and $r \geq L$ are kept un-changed for all forty optimizations.

Performing optimizations for many values of trade off metric 104 can be computationally intensive requiring hours of processing time even for business models of average size and complexity. If the business model contains additional complexities such as nonlinearities, or is relatively large, processing time can increase accordingly.

Figure 3:
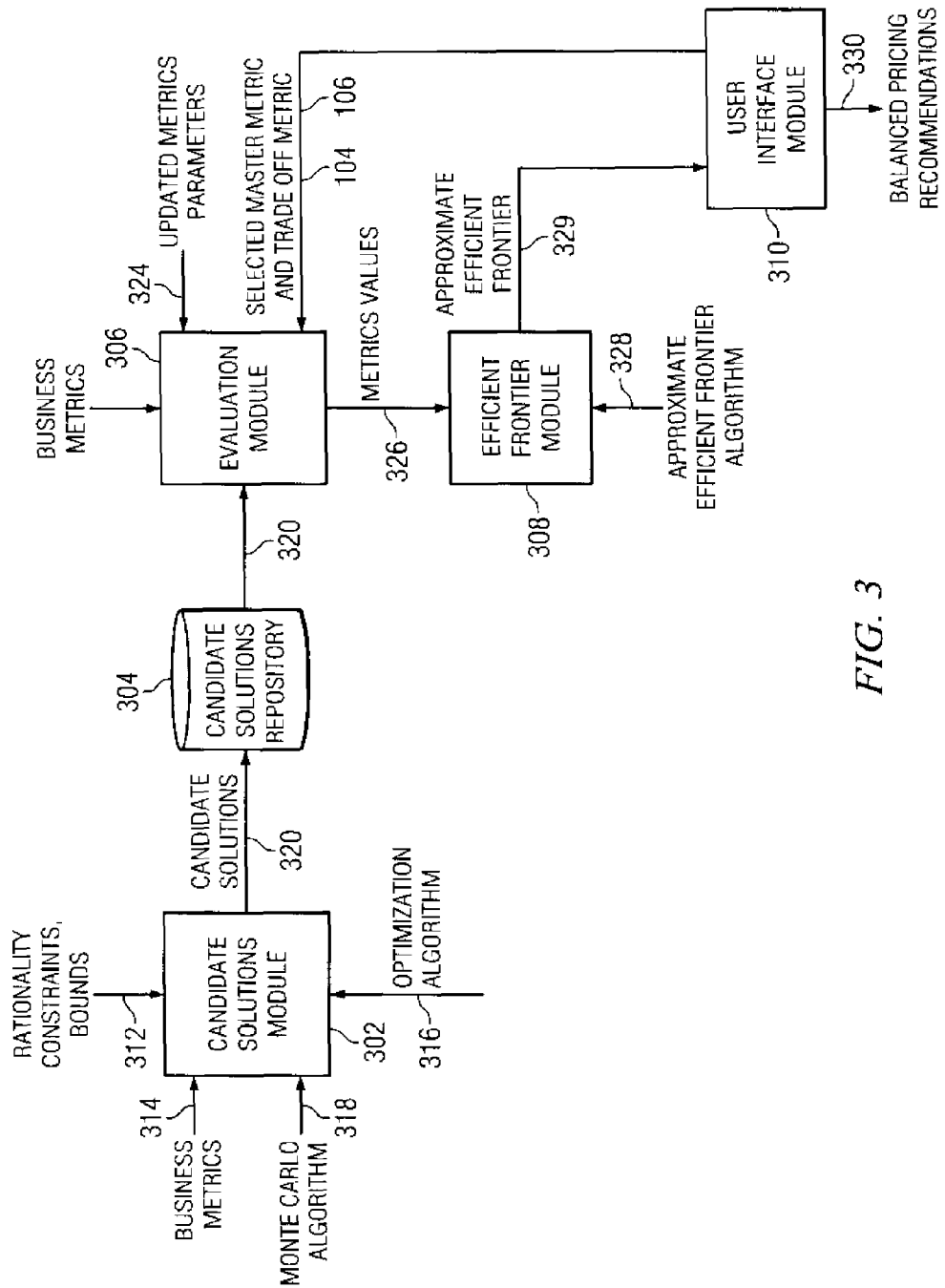
FIG. 3 illustrates a block diagram of one embodiment of another system that is a subsystem of the system in FIG. 2.

With reference now to FIG. 3, FIG. 3 illustrates one embodiment of system 300, which according to various embodiments, can generate many efficient frontiers 100 and associated pricing recommendations when called upon to do so, in real time, and using a fraction of the real time processing associated with previously available systems even when users desire to balance multiple metrics. System 300 can include candidate solution module 302, candidate solution repository 304, evaluation module 306, efficient frontier module 308, and user interface module 310. Candidate solution module 302 can use rationality constraints and bounds 312, metrics 314, optimization algorithms 316, Monte Carlo algorithm 318, etc. to generate numerous candidate solutions 320. Candidate solutions can reflect operating points of a particular enterprise as measured by a master metric and a metric to be traded off against the master metric, which satisfies associated operating constraints, and can be deemed a "trade off metric." Candidate solutions module 302 can generate candidate solutions 320 when processing resources are available, off line, in batch mode, etc. Candidate solutions module 302 forwards candidate solutions 320 associated pricing recommendations, and other information to candidate solutions repository 304 for storage, retrieval, subsequent use, etc. Candidate solutions repository 304 can retain candidate solutions 320 for as long as desired.

Evaluation module 306 can accept user selections of master metric 106 and trade off metric 104 as selected by users from amongst the business metrics 314, candidate solutions 320 (from candidate solution repository 304), and metric parameter updates 324 to produce master and trade off metrics values 326 for the stored candidate solutions 320. Evaluation module 306 can produce master and trade off metrics values 326 upon-demand and send master and trade off metric values 326 to efficient frontier module 308. Using approximate efficient frontier algorithm 328 and master and trade off metric values 326, efficient frontier module 308 can generate an approximate efficient frontier 329 for the selected metrics on-demand. Efficient frontier module 308 can send the approximate efficient frontier 329 to user interface module 310.

User interface module 310 can accept approximate efficient frontier 329, candidate solutions 320 (from candidate solutions repository 304), and user selections of master metric 106 and trade off metric 104 (from user 104). User interface module 310 can display the particular approximate efficient frontier 100 based on user selected master metric 106 and trade off metric 104. When desired, users can mouse over points on displayed approximate efficient frontier 329 to indicate to user interface module 310 a point for which users wish to see balanced pricing recommendations 330.

Figure 4:
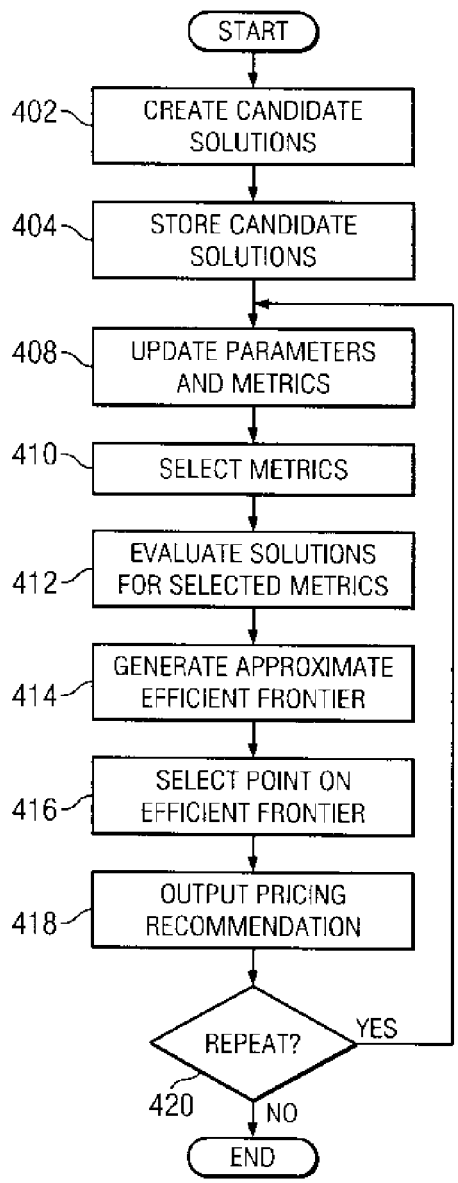
FIG. 4 illustrates a flowchart of one embodiment of a method for generating pricing recommendations.

With reference now to FIG. 4, FIG. 4 illustrates a flowchart of one embodiment of a method 400 for generating pricing recommendations 300. In step 402 of method 400, a large number of candidate solutions 320 can be generated which meet various price rationality constraints and obey the price bounds (such as a price has to be within a lower and an upper bound) related to the products under consideration. A Monte Carlo algorithm can be used to generate candidate solutions 320. Step 402 can be performed when processing resources are available, e.g. nightly. Optimization module 316 can generate candidate solutions 320 by solving potentially numerous auxiliary optimization problems (which have the same price rationality constraints and bounds as the original business problem).

In the course of iteratively solving various auxiliary optimization problems, optimization module 316 generates, for each such auxiliary optimization problem, many intermediate solutions before converging at the optimal one. These intermediate solutions also meet pertinent pricing rationality constraints and bounds and therefore they are added to the repository of candidate solution along with optimal solutions for each auxiliary problem. Optimization module 316 can generate as many candidate solutions 320 (whether intermediate or optimal) as may be desired by solving the various auxiliary optimization problems until the desired number of candidate solutions 320 is reached. Processing time, in some embodiments, may be reduced by performing fewer optimization problems.

Various embodiments implement methods in which candidate solutions 320 can be generated in a randomized fashion. Various embodiments employ Monte Carlo algorithms to randomly generate candidate solutions 320. The objective function of the Monte Carlo algorithm's auxiliary problems can be created in many ways. In some embodiments, though, the objective function can be created by linearly combining various pertinent business objectives with random or user selected coefficients determining the weight each business objective contributes to the combined objective function. The business objectives can be specific objective functions (with particular parameter values) such as the profit function for a previous week. In one scenario, the optimization problem has five business objectives of interest. In the auxiliary problem, a single objective can be formed by adding the five metrics after multiplying each by a random coefficient.

In another scenario, the relationship between master metric 106 (profit in some scenarios) and trade off metric 104 (sales volume in some scenarios) can be expressed as:

$$\text{PROFIT}(r) = a^* \exp(-br)$$

$$\text{Volume}(r) = c^* r^2$$

Where a, b and c can be user selected parameters. Suppose we want to use the parameter values for the last week for which pricing and demand date are available, so a, b and c have values 2, 5 and 8 respectively. In the current scenario, one of the auxiliary objectives could be:

$$\text{randNum}_1 {}^* 2^* \exp(-5r) + \text{randNum}_2 {}^* 8^* r^2$$

Where randNum$_1$ and randNum$_2$ are random numbers. When, for another user selected week, coefficients a, b and c have values 10, 30 and 40 respectively, another auxiliary objective could be:

$$\text{randNum}_1 {}^* 10^* \exp(-20r) + \text{randNum}_2 {}^* 40^* r^2$$

As described by the foregoing, a Monte Carlo algorithm can be used to generate candidate solutions 320 in step 402 of some embodiments. Monte Carlo algorithms, such as those described herein, can be efficient, robust, well performing sources of candidate solutions 320. Candidate solutions 320 can be stored in repository 304 in step 404. Other information associated with candidate solutions 320 can also be stored in repository 304.

When desired, users can update parameters (such as a, b, and c in the preceding example) and metrics pertinent to the products for which pricing optimization is sought. See step 408 of FIG. 4. On an on-demand basis, in step 410, users may select a particular master metric 106 and a particular trade off metric 104 for use in generating approximate efficient frontier 100. In step 412, evaluation module 306 can evaluate the values for master metric 106 and trade off metric 104 for each, or some, of candidate solutions 320 generated in step 402. The updated parameters can be used in the evaluation performed in step 412. In some embodiments, evaluation module 306 retrieves a subset (not all) of candidate solutions 320 and evaluates master metric 106 and trade off metric 104 for each.

Figure 5:
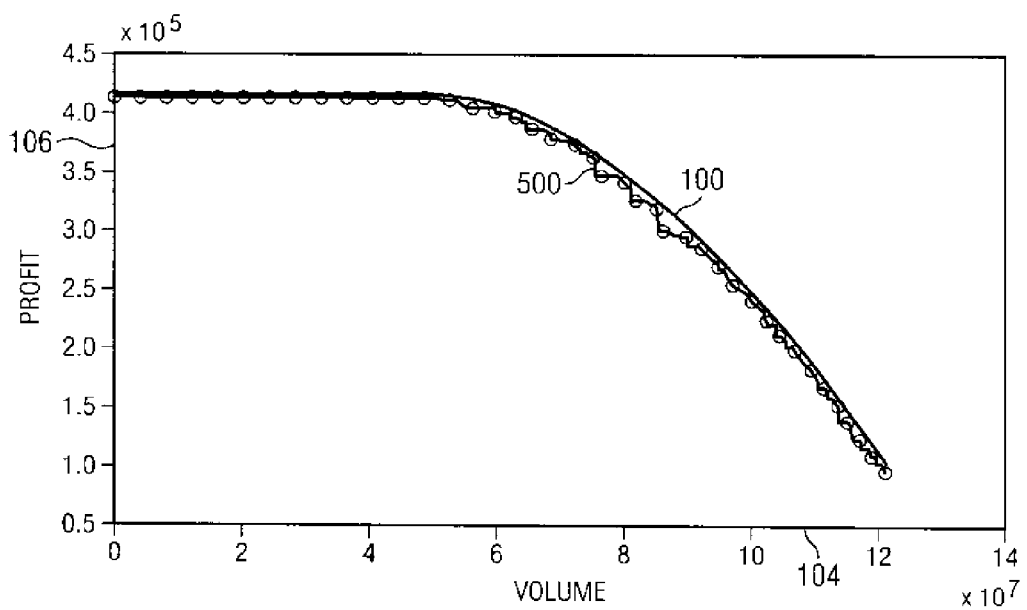
FIG. 5 illustrates a plot of one embodiment of an efficient frontier and one embodiment of an approximate efficient frontier.
Figure 6:
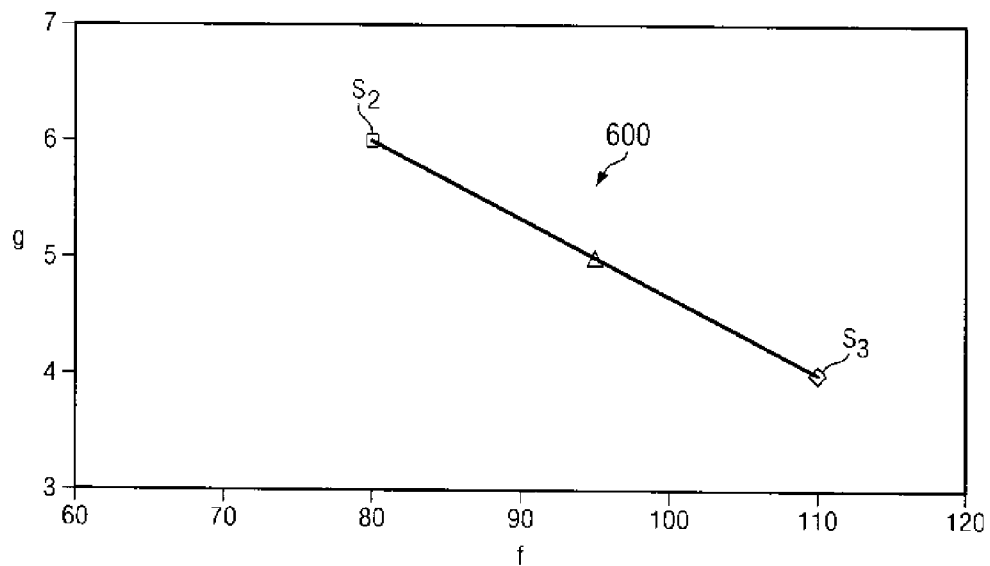
FIG. 6 illustrates a plot of one embodiment of an approximate efficient frontier.

FIG. 5 illustrates efficient frontier 100 and approximate efficient frontier 500. Efficient frontier module 308, in step 414, can use the pairs of values for master metric 106 and trade off metric 104 evaluated in step 412 to generate approximate efficient frontier 500. In various embodiments, efficient frontier module 308 can generate approximate efficient frontier 500 on an on-demand basis. In some embodiments, users can select different master metric 106 and trade off metric 104 pairs and have system 300 generate corresponding approximate efficient frontiers 500 in real-time. In generating approximate efficient frontiers 500, efficient frontier module 308 can respond sufficiently fast to keep pace with user requests for new, additional, modified, etc. approximate efficient frontiers 500. FIG. 6 illustrates a simplified artificial efficient frontier 600 which will be discussed with reference to FIG. 7.

Figure 7:
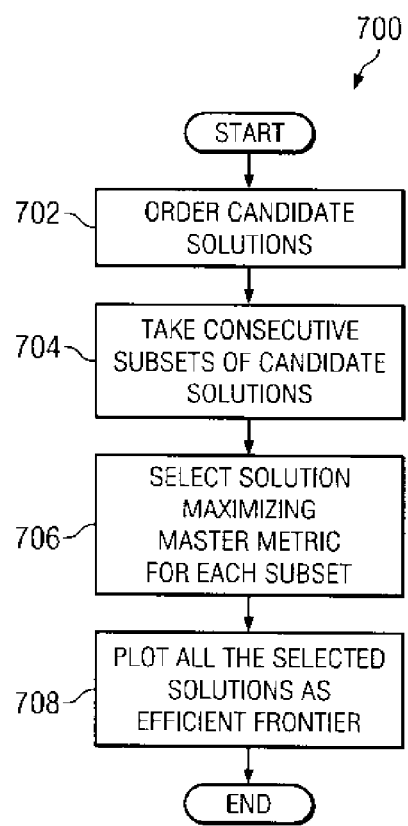
FIG. 7 illustrates a flowchart of one embodiment of a method for generating approximate efficient frontiers.

FIG. 7 illustrates one embodiment of a method 700 for creating approximate efficient frontiers 500. Creation of approximate efficient frontier 500 in step 414 can be described mathematically with the following algorithm (the approximate efficient frontier algorithm). In the current scenario, it will be assumed that optimization can refer to maximizing master metric 106. Optimization, in other scenarios, can mean minimizing a particular master metric or obtaining some other user selected goal. In the current scenario:

f can denote trade off metric.

g can denote master metric.

K can denote the number of pertinent candidate solutions in candidate solution repository 304.

S denotes a candidate solution.

Index i denotes a particular candidate solution with the greatest value for master metric g from among a set of candidate solutions $\{S_j, S_{j+1}, S_{j+2}, \ldots, S_k\}$.

At step 702, candidate solutions 320 (obtained in step 402) can be listed in order of increasing values for trade off metric f (the values off and g can be obtained in step 412):

| f | g | Candidate Solution |
|---|---|---|
| $f_1$ | $g_1$ | $S_1$ |
| $f_2$ | $g_2$ | $S_2$ |
| ... | ... | ... |
| $f_K$ | $g_K$ | $S_K$ |

The foregoing ordered list of candidate solutions can be referred to as Series 1. Note that $f_1 < \ldots < f_K$.

At step 704 in generating the approximate efficient frontier, module 308 can further process Series 1 as follows. For each j where j=1, 2, ... K, a subset of Series 1 is formed by taking the solutions with index at least j: $S_j, S_{j+1}, \ldots S_K$. At step 706, for each subset, we find a solution that has the greatest value of the master metric g, denote index of this solution by j* so that we have $g_{j*} = \max(g_j, g_{j+1}, \ldots, g_K)$ In some embodiments, when more than one candidate solution 320 has the same greatest value of $g_{j*}$ at step 706 module 308 can select candidate solution 320 with the smallest index. The resulting set (hereinafter Series 2) of candidate solutions 320 can therefore contain candidate solutions 320 with maximum values $g_{j*}$ for various values of the minimum requirement for trade off metric f. Series 2 may be much shorter than Series 1 as only the unique maximizing candidate solutions for each set are kept (therefore K*<K)

| Series 2 | | |
|---|---|---|
| f | g | Candidate Solution |
| $f_{1*}$ | $g_{1*}$ | $S_{1*}$ |
| $f_{2*}$ | $g_{2*}$ | $S_{2*}$ |
| ... | ... | ... |
| $f_{K*}$ | $g_{K*}$ | $S_{K*}$ |

When plotted at step 708, as illustrated in FIG. 5, Series 2 can create approximate efficient frontier 500. Series 2 can contain candidate solutions 320 which, for each value of trade off metric f, have approximately optimal values for master metric g. Since Series 2 approximates optimal efficient frontier 100, plots of Series 2 can be referred to as approximate efficient frontier 500.

With reference again to FIG. 5, efficient frontiers 100 and 500 relate to a particular optimization scenario in which prices for 99 products were optimized. Both efficient frontiers 100 and 500 were generated using a 3.20 GHz Pentium 4® processor. Generating optimized efficient frontier 100 (which includes only 40 points) required 30 minutes of processing whereas the online portion of method 400 of one embodiment consumed only 10 seconds of processing time despite utilizing 5,000 candidate solutions. Additionally, the formulation of the optimization problem in method 400 was simpler than with previously available approaches because, in part, non-linear constraints did not have to be included.

In one scenario, optimization module 316 can generate candidate solutions 320 as shown below:

| Series 1 | | |
|---|---|---|
| f | g | S |
| 70 | 5 | $S_1$ |
| 80 | 6 | $S_2$ |
| 110 | 4 | $S_3$ |

From Series 1, optimization module 316 can create Series 2 as shown below:

| Series 2 | | |
|---|---|---|
| f | g | S |
| 80 | 6 | $S_2$ |
| 110 | 4 | $S_3$ |

Some embodiments provide capabilities, via user interface module 310, for users to mouse over approximate efficient frontier 500 and select certain points on efficient frontier 500 or 600 (of FIG. 5 or 6 respectively) for further consideration. User interface module 310 can retrieve a pricing recommendation associated with the selected point from candidate solutions repository 304 and display it for various users. When a user selects a point on approximate efficient frontier 500, user interface module 310 can retrieve the pricing recommendations associated with a candidate solution 320 to the immediate right of the selected point; interpolate between such pricing recommendations, etc. User interface module 310 may output the pricing recommendation for further processing. In one scenario, a user selects candidate solution $S_2$ and user interface module 310 displays the pricing recommendation associated with candidate solution $S_2$. In one scenario, a user selects a point corresponding to a value of 95 for trade off metric 104 and a value of 5 for master metric 106 which happens to lie between candidate solutions $S_2$ and $S_3$, user interface module 310 can display the pricing recommendation associated with candidate solution $S_3$ which lies immediately to the right of the point of the frontier selected by the user) If desired, user interface module 310 can forward the selected candidate solution 320, the associated pricing recommendation, or combinations to other modules for further processing.

Embodiments provide advantages over previously available optimization approaches. Embodiments provide timely visibility into trade offs between many different pairs of metrics. Embodiments allow splitting the optimization process into an off-line and an on-line parts. Processing time associated with on-demand activities is thus greatly reduced by embodiments. Approximate efficient frontiers and associated pricing recommendations can be provided on-demand rapidly enough that embodiments can keep pace with user requests. Users can make ad hoc parameter and metric updates while systems of embodiments can keep pace with the updates while also providing visibility into the impact of the changes. Embodiments allow users to select points on approximate efficient frontiers and obtain pricing recommendations associated with the points. Some embodiments allow a user to select approximate efficient frontier points by mousing over the points. Pricing recommendations selected by users (and the associated approximate efficient frontier) can be further processed according to some embodiments. Pricing optimization systems and methods of embodiments can be used in any industry.

Although embodiments have been described in detail herein, it should be understood that the description is by way of example only and is not to be construed in a limiting sense. It is to be further understood, therefore, that numerous changes in the details of the embodiments and additional embodiments will be apparent, and may be made by, persons of ordinary skill in the art having reference to this description. It is contemplated that all such changes and additional embodiments are within scope of the claims below and their legal equivalents.

What is claimed is:

1. A method for optimizing a pricing strategy using an efficient frontier defined by a relationship between a master metric and a trade off metric, the method comprising:
generating off-line, by a processor, a plurality of candidate solutions, each of which comprises a pricing recommendation that satisfies pricing rationality constraints, by performing a series of pricing optimizations;
storing, by the processor, the candidate solutions in a repository;
selecting, by the processor, a first master metric and a first trade off metric;
evaluating, by the processor, values of the first master metric and first trade off metric associated with the candidate solutions; and
performing, by the processor, a real-time algorithm that generates, directly from the candidate solutions, an approximate version of the efficient frontier that is defined by the values of the first master metric and trade off metric.

2. The method of claim 1 wherein the generating the candidate solutions further comprises using a Monte Carlo algorithm.

3. The method of claim 2 further comprising combining a plurality of metrics to form a singular objective for the Monte Carlo algorithm.

4. The method of claim 1 further comprising selecting a subset of the candidate solutions using the approximate efficient frontier algorithm.

5. The method of claim 4 further comprising outputting a candidate solution comprising a corresponding pricing recommendation based on a selected point on the approximate efficient frontier.

6. The method of claim 4 wherein the selecting the subset of the candidate solutions further comprises mousing over a point on the approximate version of the efficient frontier.

7. The method of claim 1 further comprising updating a set of metric parameters approximately simultaneously with the selecting the first master metric and the first trade off metric.

8. The method of claim 1 wherein the generating the plurality of candidate solutions occurs when processing resources are available.

9. The method of claim 1 further comprising selecting a second master metric and a second trade off metric and evaluating the values of the second master metric and second trade off metric associated with the candidate solutions, performing the approximate efficient frontier algorithm and outputting another approximate efficient frontier.

10. A system for optimizing a pricing strategy with respect to an efficient frontier defined by a relationship between a master metric and a trade off metric, the system comprising:
a user interface;
a processor in communication with the user interface; and
a machine readable medium in communication with the processor and carrying instructions which when executed by the processor cause the processor to:
generate off-line a plurality of candidate solutions, each of which comprises a pricing recommendation that satisfies pricing rationality constraints, by performing a series of pricing optimizations;
store the candidate solutions in a repository;
select a first master metric and a first trade off;
evaluate values of the first master metric and first trade off metric associated with the candidate solutions; and
perform a real-time algorithm that generates, directly from the candidate solutions, an approximate version of the efficient frontier that is defined by the values of the first master metric and trade off metric.

11. The system of claim 10 wherein the instructions further cause the processor to generate the candidate solutions using a Monte Carlo algorithm.

12. The system of claim 11 wherein the instructions further cause the processor to combine a plurality of metrics to form a singular objective for the Monte Carlo algorithm.

13. The system of claim 10 wherein the instructions further cause the processor to accept a selection of a subset of the candidate solutions using the approximate efficient frontier algorithm.

14. The system of claim 13 wherein the instructions further cause the processor to output a candidate solution comprising a corresponding pricing recommendation based on a selected point on the approximate efficient frontier.

15. The system of claim 13 further comprising a mouse of the user interface and wherein the instructions further cause the processor to accept the selection of the subset of the candidate solutions via the mouse wherein a user mouses over a point on the approximate version of the efficient frontier.

16. The system of claim 10 wherein the instructions further cause the processor to update a set of metric parameters approximately simultaneously with accepting the selection of the first master metric and the first trade off metric.

17. The system of claim 10 wherein the generating the plurality of candidate solutions occurs when processing resources are available.

18. A non-transitory machine readable medium carrying instructions which when executed by a machine cause the machine to:
generate off-line a plurality of candidate solutions, each of which comprises a pricing recommendation that satisfies pricing rationality constraints, by performing a series of pricing optimizations wherein some of the candidate solutions may come from intermediate iterations in each optimization;
store the candidate solutions in a repository;
select a first master metric and a first trade off metric;
evaluate values of the first master metric and first trade off metric associated with the candidate solutions; and
perform a real-time algorithm that generates, directly from the candidate solutions, an approximate version of the efficient frontier that is defined by the values of the first master metric and trade off metric.

19. The system of claim 18 wherein the instructions further cause the processor to generate the candidate solutions using a Monte Carlo algorithm.

20. The system of claim 19 wherein the instructions further cause the processor to combine a plurality of metrics to form a singular objective for the Monte Carlo algorithm.

21. The system of claim 18 wherein the instructions further cause the processor to perform the approximate efficient frontier algorithm.

* * * * *